United States Patent [19]

Wiggins

[11] 4,270,813
[45] Jun. 2, 1981

[54] BEARING POSITIONING RETAINER

[75] Inventor: Noel D. Wiggins, Chillicothe, Ill.

[73] Assignee: Caterpillar Tractor Co., Peoria, Ill.

[21] Appl. No.: 99,141

[22] PCT Filed: Aug. 23, 1979

[86] PCT No.: PCT/US79/00641

§ 371 Date: Aug. 23, 1979

§ 102(e) Date: Aug. 23, 1979

[87] PCT Pub. No.: WO87/00604

PCT Pub. Date: Mar. 5, 1981

[51] Int. Cl.³ .............................................. F16C 3/10
[52] U.S. Cl. .................................. 308/23; 308/237 R
[58] Field of Search ............. 308/23, 179, 167, 237 R, 308/236, 74, 78, 23.5

[56] References Cited

U.S. PATENT DOCUMENTS

| 4,073,550 | 2/1978 | Yahrans | 308/167 |
| 4,114,961 | 9/1978 | Pithie | 308/23 |
| 4,175,799 | 11/1979 | Davis et al. | 308/23 |

Primary Examiner—Lenard A. Footland
Attorney, Agent, or Firm—Phillips, Moore, Weissenberger, Lempio & Majestic

[57] ABSTRACT

Semicylindrical bearing shells (12) are mounted with their radially outwardly facing semicylindrical surfaces (14) against a mating surface (16) of a bearing cap (18) or an engine block (49). Such shells (12) have previously been held against rotation by tab and slot arrangements. They have either not been held against falling away from the mating surface (16), or screws have been centrally affixed through the shells (12) and into the bearing cap (18) or block (49). Such screws have interfered with proper lubrication of radially inwardly facing surfaces (20) of such shells (12). The improvement herein includes a pair of indentations (22a, 22b) in the outwardly facing surface (14), one at each end (24a, 24b) of the shell (12) and a pair of abutting indentations (28a, 28b) in the mating surface (16). A pair of members (30a, 30b or 30'a, 30'b) are held in respective shell indentations (22a, 22b) and abutting indentations (28a, 28b). The members (30a, 30b or 30'a 30'b) hold the shells (12) against the mating surface (16).

3 Claims, 5 Drawing Figures

BEARING POSITIONING RETAINER

DESCRIPTION

1. Technical Field

This invention relates to a retainer for semicylindrical bearing shells. The shells fit into a bore (matching cylindrical recess) of an engine block or into a bearing cap. The crankshaft of the engine is in bearing contact with the shell.

2. Background Art

Semicylindrical bearing shells, commonly known as half shell bearings, are conventionally utilized in a number of engine systems with the half shell bearings being positioned along the crankshaft and in bearing relation thereto. In the past, tabs have been stamped into the outer ends of the outer surface of the bearing, and mating tab slots have been machined into the engine block, or more usually into bearing caps which are themselves bolted to the block. The purpose of the slots is to receive the tabs. Such tab and tab slot arrangements successfully keep the half shell bearing from rotating relative to the cap or block. However, such tab and slot arrangements do not keep the bearing from falling downwardly out of the cap or block when such bearings are downwardly facingly positioned. When the crankshaft is in place, this provides means for holding one of the half shell bearings in the cap or block. However, during assembly the half shell bearing is not held in place.

Attempts have been made in the past to keep half shell bearings from falling out of bearing caps and blocks. One method of doing this has been to tap a hole through the bearing halfway between the ends thereof and halfway between the sides thereof, and to pass a bolt or screw through this hole and into a mating hole in the cap or block. However, and particularly in large engines, it is often necessary to provide pressurized lubricant to the crankshaft contacting surface of the half shell bearing. Further, the best place to supply this pressurized fluid is at the same position where the aforementioned hole has been passed through the half shell bearing to hold it in place. Hence, the use of bolts or screws passing through the half shell bearing centrally thereof is particularly disadvantageous in such situations. Still further, when a bolt or screw is utilized, and the head or holding portion of the bolt or screw is at, or even near, the infacing crankshaft mating surface of the half shell bearing, problems of cavitation are introduced which can lead to faster and uneven bearing wear. Accordingly, even at displaced positions from the center of the half shell bearing, the use of such bolts or screws as communicate with the infacing bearing surface, is undesirable.

Even when it is not necessary to hold a half shell bearing from falling out of an appropriate cavity in a cap or engine block, it is noted that considerable machining is required to provide the aforementioned tabs and tab slots. This increases the overall cost of the apparatus significantly.

It is desirable to provide means for holding a half shell bearing in place in a bearing cap or engine block without in any way effecting the inwardly facing bearing surface which bears against the crankshaft. And, it is even more desirable if the structure which accomplishes this also prevents rotation of the bearing during engine operation. Further, it is particularly desirable that such a structure should provide a positive method of aligning the half shell bearing relative to the crankshaft.

DISCLOSURE OF INVENTION

The present invention is directed to overcoming one or more of the problems as set forth above.

According to the present invention, an improvement is provided in an apparatus wherein a generally semicylindrical bearing shell is mounted with a radially outwardly facing semicylindrical surface thereof against a mating radially inwardly facing semicylindrical surface of an associated member such as a bearing cap or engine block, with the side surfaces of the shell forming a generally continuous surface with a surface of the cap or block, and with a radially inwardly facing surface of the shell positioned to receive a relatively rotating shaft. The improvement comprises a first pair of indentations in the outer ends of the outwardly facing semicylindrical surface of the shell, one at each end thereof and communicating with the generally continuous surface; a second pair of indentations in the inwardly facing semicylindrical surface of the cap or block, each cap or block indentation abutting a respective one of the shell indentations and communicating with the generally continuous surface; a pair of members, each member being sized and shaped to fit in a respective shell indentation and a respective adjoining cap or block indentation; and means for holding each of said members in said respective shell indentation and said respective adjoining cap or block indentation.

The aforementioned improvement solves the problem of half shell bearings falling out of contact with bearing caps or engine blocks. Further, rotation of the half shell bearing is prevented. Still further, such is prevented without providing any incongruities on the inwardly facing bearing surface of the half shell bearing. Further yet, with an improvement as set out above, pressurized lubricant can be supplied to the inwardly facing bearing surface of the half shell bearing, at the point central thereof, where it is most advantageously useful. Also, the improvement provides the capability for relatively precisely controlled machining of the parts so that the positioning of the half shell bearing can be precisely controlled. This allows use of the full width of the bearing and prevents the crankshaft journal fillet radius from riding into the side of the bearing.

BEST MODE FOR CARRYING OUT THE INVENTION

Figure 1:
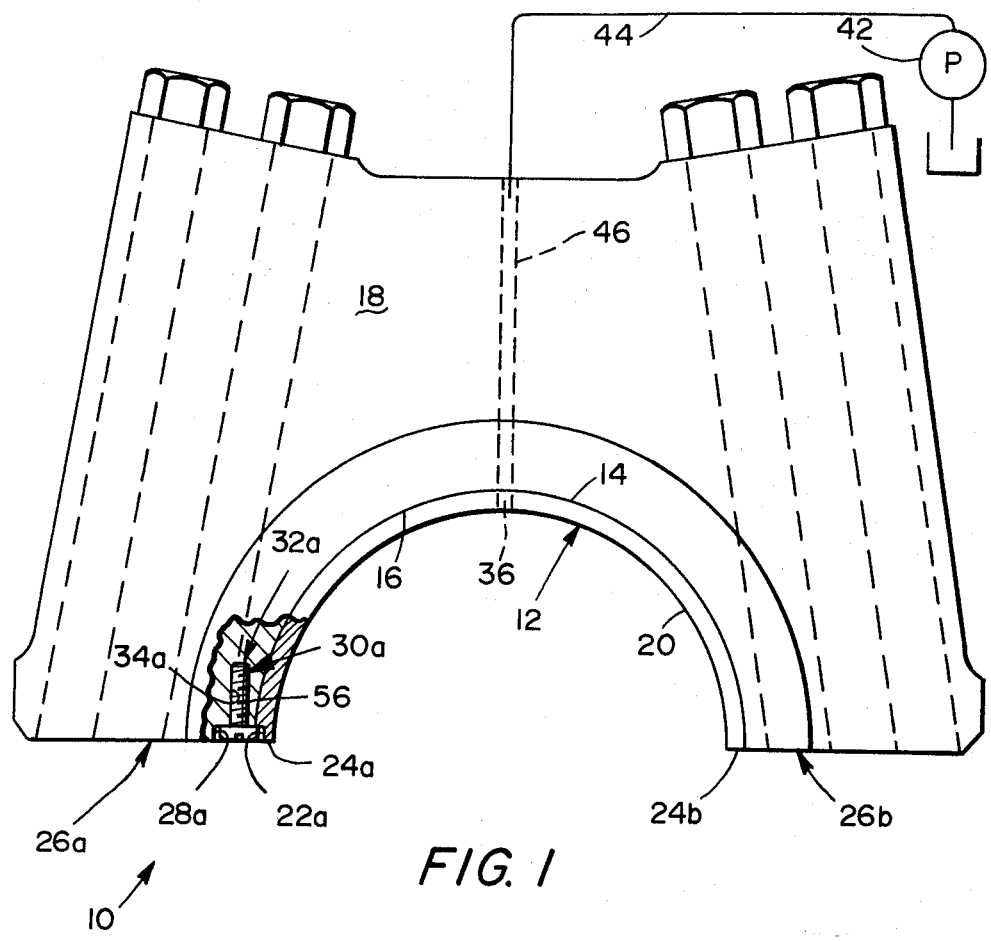
FIG. 1 illustrates in end view, partially sectioned, an embodiment in accordance with the present invention.
Figure 2:
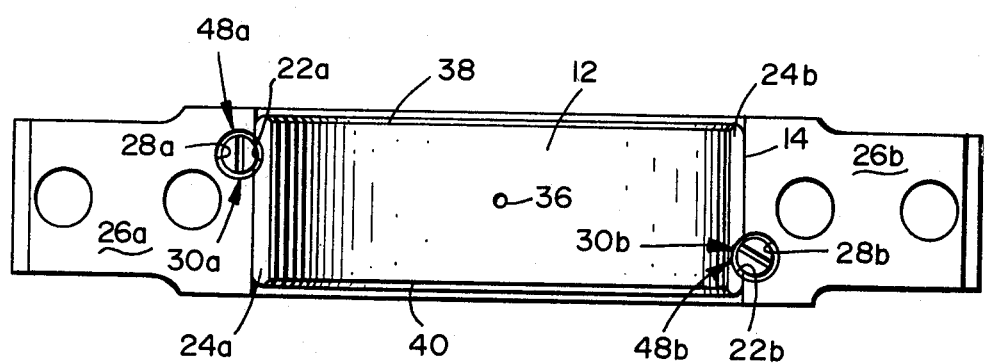
FIG. 2 illustrates a bottom view of the FIG. 1 embodiment.

Referring to FIGS. 1 and 2, there is illustrated therein a first embodiment in accordance with the present invention. An arrangement 10 is shown wherein a generally semicylindrical bearing shell 12 is mounted with a radially outwardly facing semicylindrical surface 14 thereof against a mating radially inwardly facing semicylindrical surface 16 of an associated member such as a bearing cap 18. It is noted that a similar structure exists when the shell 12 is directly attached to an engine block. A radially inwardly facing surface 20 of the bearing shell 12 is positioned to bearingly accept a relatively rotating shaft such as a crankshaft. It should be noted that the term "semicylindrical" is used herein in its broader sense to mean having a cylindrically arcuate shape, and not necessarily to mean being the shape of exactly one-half of a cylinder.

In accordance with the invention, a first pair of indentations 22a and 22b (FIG. 2) are formed in the outwardly facing surface 14 of the bearing shell 12. One of the indentations 22a is at a first end 24a and the second indentation 22b is at a second end 24b of the bearing shell 10. The end 24a of the bearing shell 12 forms a generally continuous surface 26a with the cap 18 and the end 24b of the bearing shell 12 forms a generally continuous surface 26b with the cap 18. The indentations 22a and 22b each communicate respectively with the generally continuous surfaces 26a and 26b as is most apparent by reference to FIG. 1. The indentations 22a and 22b can be precisely machined to help assure use of the full width of inwardly facing surface 20 against the crankshaft.

A second pair of abutting or adjacent indentations 28a and 28b are formed in the inwardly facing semicylindrical surface 16 of the cap 18. Each abutting indentation 28a and 28b abuts a respective one of the shell indentations 22a and 22b. Each of the abutting indentations 28a and 28b communicate with the respective generally continuous surface 26a and 26b. The second pair of indentations 28a and 28b can also be precisely machined to help assure use of the full width of the inwardly facing surface 20 against the crankshaft.

A pair of members 30a and 30b are provided which are sized and shaped to fit in a respective shell indentation 22a or 22b and a respective abutting indentation 28a or 28b. In the particular embodiment illustrated in FIGS. 1 and 2 the members 30a and 30b are headed bolts.

Means 32a are provided for holding the member 30a in the shell indentation 22a and in the abutting indentation 28a. Identical means (not illustrated) serve for holding the member 30b in the shell indentation 22b and the abutting indentation 28b. In the particular embodiment of FIGS. 1 and 2, the holding means 32a is a thread 34a in the cap 18 with the thread being sized and positioned to screwably receive the threaded fastener head.

Reference to FIG. 1 will show a passageway 36 through the bearing shell 12 from the outwardly facing surface 14 thereof to the inwardly facing surface 20 thereof. The passageway 36 is located intermediate the ends 24a and 24b of the bearing shell 12 and is also intermediate a first side 38 and a second side 40 thereof. A pump 42 and associated tubing 44 serves as means for supplying pressurized fluid via a passageway 46 in the cap 18 to the passageway 36 which passes through the semicylindrical bearing shell 12.

Adverting particularly to FIG. 2, it will be noted that a first cavity 48a, formed of the abutting respective shell indentation 22a and abutting cap indentation 28a, is less than halfway from the first side 38 to the second side 40 of the bearing shell 12. Further, a second cavity 48b, formed of the abutting respective shell indentation 22b and respective abutting cap indentation 28b, is less than halfway from the second side 40 of the bearing shell 12 to the first side 38 thereof. It should be noted that the respective indentations 22a, 22b, 28a and 28b can be so placed that the bearing shell 12 can be fastened in place should the ends 24a and 24b thereof be reversed as by 180° rotation by positioning the indentations 22a, 22b, 28a and 28b, and thereby the first cavity 48a and the second cavity 48b, an equal distance respectively from the first side 38 and second side 40 of the bearing shell 12. Also, if desired, the indentations 22a and 28a may be placed a different distance from the first end 38 of the bearing shell 12 then the indentations 22a and 22b are placed from the second end 40 of the bearing shell 12. In such a situation, it will only be possible to mount the bearing shell 12 in one particular orientation relative to the cap 18.

Figure 3:
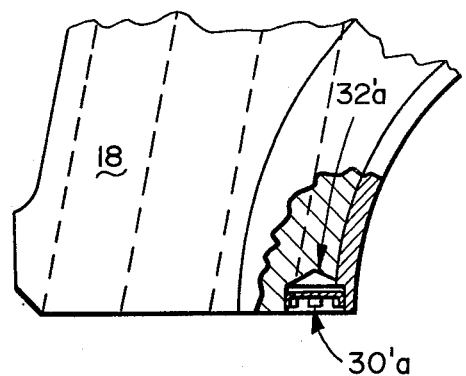
FIG. 3 illustrates in end partial view, partially sectioned, an alternate embodiment in accordance wtih the present invention.
Figure 4:
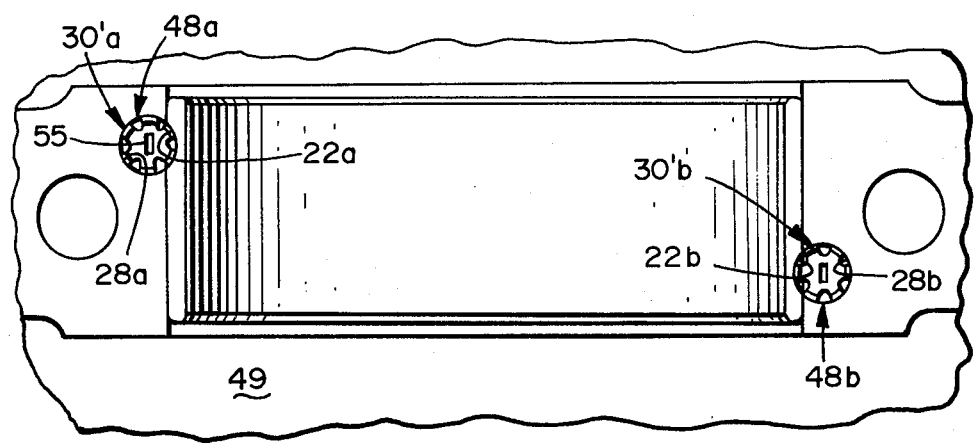
FIG. 4 illustrates, in enlarged side view, a structure used in the alternate embodiment of FIG. 3.

Adverting now to FIGS. 3 and 4, there is illustrated therein an alternate and preferred embodiment of the present invention. FIG. 4, in particular, shows use of the alternate embodiment directly on an associated member such as an engine block 49 instead of a bearing cap 18. The alternate embodiment illustrated in FIGS. 3 and 4 has certain advantages over the embodiment of FIGS. 1 and 2, as will be pointed out in following. Briefly, the embodiment of FIGS. 3 and 4 differs from the embodiment of FIGS. 1 and 2 in that the holding means 32'a is significantly different, as are the members 30'a and 30'b. The particular members 30'a and 30'b are plugs (See FIG. 5), and the holding means is a periphery 50 of each of the plugs 30'a and 30'b, with the periphery 50 being of a construction to exert a radial spring pressure against the respective abutting shell indentation 22a, 22b and the respective abutting cap indentation 28a and 28b.

Figure 5:
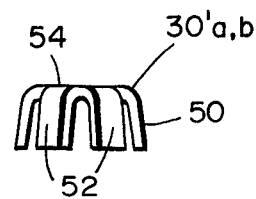
FIG. 5 illustrates, in bottom view, the embodiment of FIG. 3.

FIG. 5 shows the members 30'a and 30'b and the holding means of preference. In particular, the plugs 30'a and 30'b are formulated of spring metal which has been bent over to form a plurality of fingers 52 at the periphery 50 thereof. The plugs 30'a and 30'b are pushed upwardly into the respective cavities 48a and 48b with a first end 54 of the plugs 30'a and 30'b inserted first into the respective cavities 48a and 48b. The fingers 52 then push outwardly and bear against both the respective indentations 22a and 22b in the outwardly facing semicylindrical surface 14 of the bearing shell 12 and the abutting indentations 28a and 28b in the inwardly facing semicylindrical surface 16 of the cap 18.

As will be seen in FIG. 4, the respective cavities 48a and 48b are placed in conformance with the embodiment of FIGS. 1 and 2.

Referring particularly to FIGS. 1 and 3, it will be noted that in the embodiment of FIG. 1 the tap 34a in which the headed bolt 30a fits, necessarily creates a thinned portion 56 in the cap 18 adjacent the end 24a of the bearing shell 12. On the other hand, it can be seen by reference to FIG. 3 that the placement of the plugs 30'a and 30'b does not require the production of any thinned portion of the bearing cap 18. Further, it should be noted that the plugs 30'a and 30'b can be placed in position relatively quickly and easily and without the necessity for screwing them in place. Thus, they can be installed and removed in a quicker manner by placing a tool in slot 55.

Industrial Applicability

An improvement as described in detail above allows semicylindrical bearing shells 12 to be mounted to bearing caps 18 or engine blocks 49 so that they will not fall out. Relative rotation of the bearing shell 12 is also prevented. Further, such is accomplished without presenting any break in the continuous inwardly facing semicylindrical bearing surface of the bearing shell 12. And, relatively precise machining of the indentations 22a, 22b, 28a and 28b can be performed to help assure use of the full width of the facing surface 20 against the crankshaft. As another feature of the improvement of the invention, it is possible to supply pressurized lubricant to the inwardly facing semicylindrical bearing surface adjacent the center thereof, where the lubrication is most advantageously introduced.

Other aspects, objects and advantages of this invention can be obtained from a study of the drawings, the disclosure and the appended claims.

I claim:

1. In an apparatus (10) wherein a generally semicylindrical bearing shell (12) is mounted with a radially outwardly facing semicylindrical surface (14) thereof against a mating radially inwardly facing semicylindrical surface (16) of an associated member (18) with the ends (24a, 24b) of the shell (12) forming a generally continuous surface (26a, 26b) with said member (18) and with a radially inwardly facing surface (20) of the shell (12) positioned to receive a relatively rotating shaft, the improvement comprising:
   a first pair of indentations (22a, 22b) in said outwardly facing semicylindrical surface (14) of said shell (12), one at each end (24a, 24b) thereof and communicating with said generally continuous surface (26a, 26b);
   a second pair of abutting indentations (28a, 28b) in said inwardly facing semicylindrical surface (16) of said member (18), each of said second indentations (28a, 28b) abutting a respective one of said first indentations (22a, 22b) and communicating with said generally continuous surface (26a, 26b); and
   a pair of plugs (30'a, 30'b), each being sized and shaped to fit in said first indentations (22a, 22b) and said second indentations (28a, 28b), each of said plugs (30'a, 30'b) having a periphery (50) of a construction to exert a radial spring pressure against said respective first indentations (22a, 22b) and said second indentations (28a, 28b) sufficient to hold each of said plugs (30'a, 30'b) therein.

2. The improvement as in claim 1, wherein a first cavity (48a) formed of said first indentations (22a, 22b) and said second indentations (28a, 28b) is less than halfway from a first side (38) of the shell (12) to a second side (40) thereof and a second cavity (48b) of the abutting respective first indentations (22a, 22b) and second indentations (28a, 28b) is less than halfway from the second side (40) of the shell (12) to the first side (38) thereof.

3. The improvement as in claim 1 including:
   a passageway (36) through the shell (12) from the outwardly facing surface (14) thereof to the inwardly facing surface (16) thereof, the passageway (36) being intermediate the ends (24a, 24b) of the shell (12) and intermediate a first side (38) thereof and a second side (40) thereof; and
   means (42, 44, 46) for supplying pressurized fluid to the passageway (36).

* * * * *